United States Patent

[11] 3,625,766

[72] Inventors T. O. Paine
Administrator of the National Aeronautics and Space Administration with respect to an invention of;
Thomas H. Purcell, Jr.; Alfred W. Jordan, both of Raleigh, N.C.
[21] Appl. No. 880,250
[22] Filed Nov. 26, 1969
[45] Patented Dec. 7, 1971

[54] ELECTRIC STORAGE BATTERY
5 Claims, 17 Drawing Figs.
[52] U.S. Cl. ................................................. 136/79, 136/81, 136/166
[51] Int. Cl. ........................................................ H01m 1/04
[50] Field of Search ............................................ 136/13, 14, 15, 79, 80, 81, 166, 170

[56] References Cited
UNITED STATES PATENTS
1,481,226  1/1924  Rhodes ........................ 136/13
1,506,297  8/1924  Garrett et al. ................. 136/80
1,874,404  4/1932  Wood ............................ 136/80
2,154,841  4/1939  Gill ............................... 136/81
3,369,937  2/1968  Himy ............................ 136/80
3,471,339  10/1969 Watanabe ..................... 136/170

Primary Examiner—Donald L. Walton
Attorneys—G. T. McCoy, J. H. Warden and Monte F. Mott ABSTRACT: An electric storage battery particularly suited for resisting forces experienced in an impact environment, characterized by a plurality of flexible, narrow battery plates, of opposite polarities, suspended within a sealed housing having therein provided a pair of parallel internal surfaces including a plurality of grooves extending to define therebetween commonly dimensioned lands, a feature of the storage battery being an employment of said grooves for supporting the plates of one polarity along opposed vertical surfaces, while the plates of the other polarity are suspended therebetween in a manner such that the plates of the first polarity serve to impart lateral support to the plates of both polarities in an impact environment.

PATENTED DEC 7 1971
3,625,766
SHEET 1 OF 4
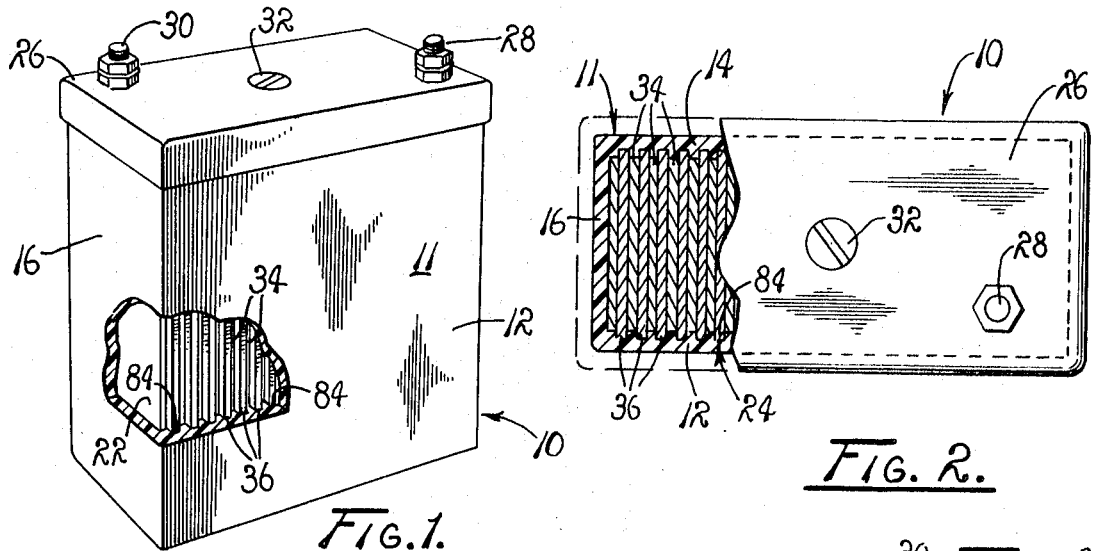
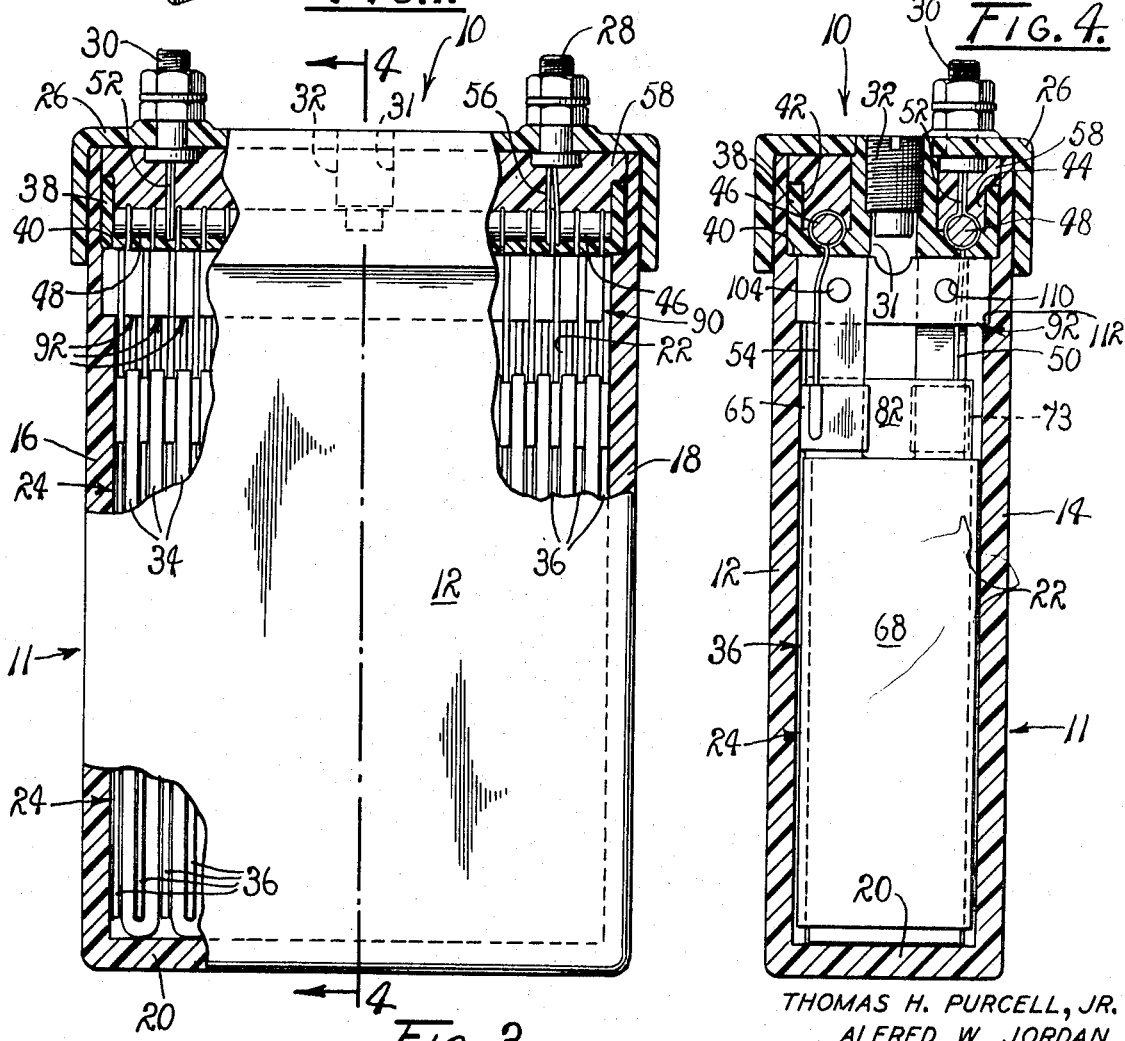
THOMAS H. PURCELL, JR.
ALFRED W. JORDAN
INVENTORS
ATTORNEYS

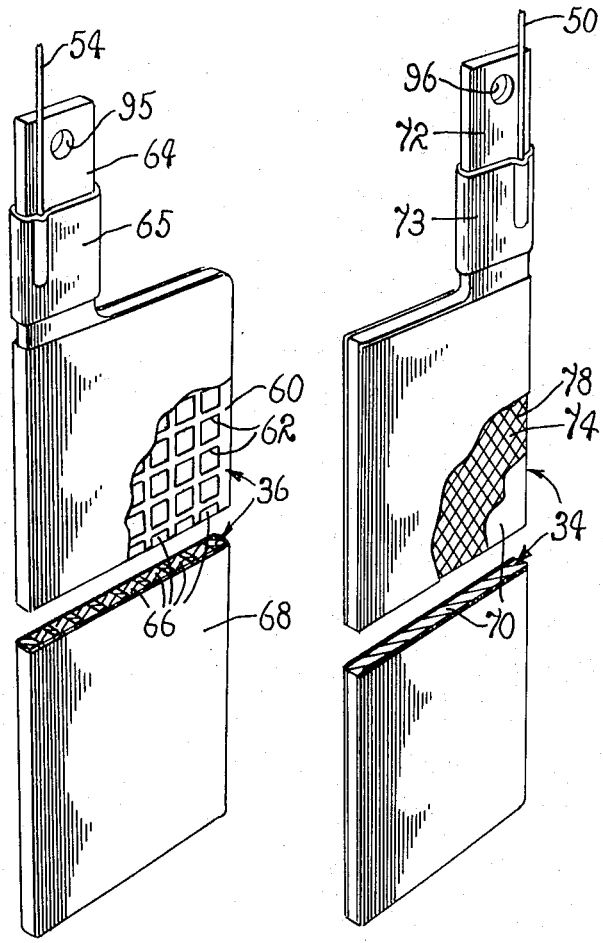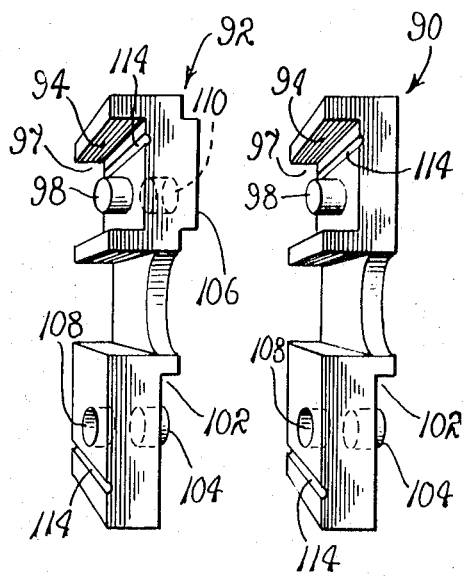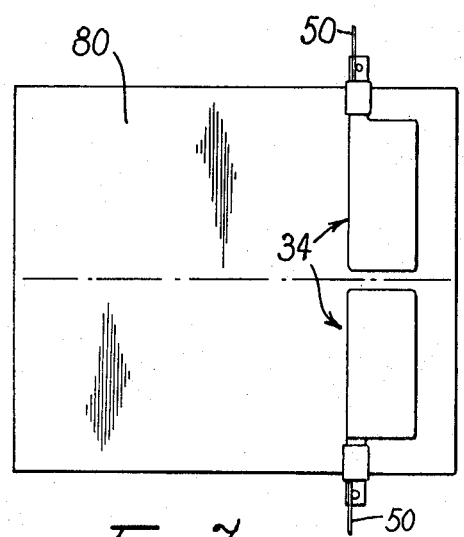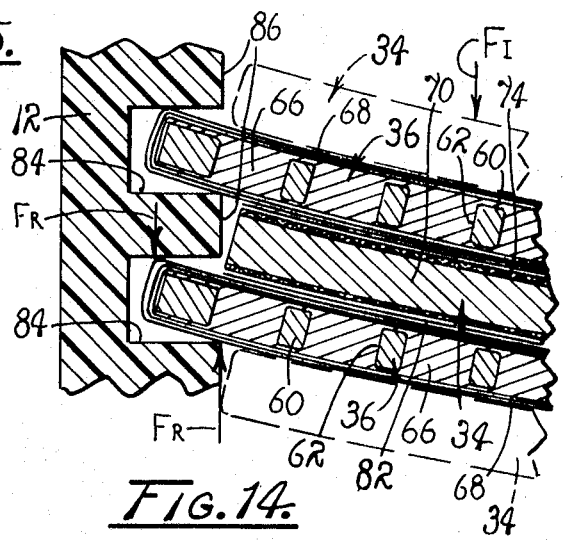

THOMAS H. PURCELL, JR.
ALFRED W. JORDAN
INVENTORS

ATTORNEYS

THOMAS H. PURCELL, JR.
ALFRED W. JORDAN
INVENTORS

ATTORNEYS

ELECTRIC STORAGE BATTERY

ORIGIN OF INVENTION

The invention described herein was made in the performance of work under a NASA contract and is subject to the provisions of Section 305 of the National Aeronautics and Space Act of 1958, Public Law 85-568 (72 stat. 435; 42 USC 2457).

BACKGROUND OF THE INVENTION

1. Field of the Invention

This invention generally relates to electric storage batteries, and more particularly to "wet cell" batteries adapted to sustain high inertial forces without encountering deleterious effects.

2. Description of the Prior Art

The prior art is replete with electric storage batteries of various types, including batteries commonly known as "wet cell" and "dry cell" batteries. While dry cell batteries normally are quite compact and have good impact resistant characteristics, it is well known that where recycling is required, the wet cell battery generally is more efficient. However, it also is well known that the heretofore available wet cell batteries tend to fail under conditions where impact forces are applied thereto, due to a fracturing and/or rupturing of the various electrodes, commonly referred to as "battery plates."

Where wet cell batteries are employed as a source of electrical energy, particularly in planetary probes, recharging is achieved through the use of energy provided by solar cells. However, it can normally be expected that the batteries will be subjected to shock or forces of impact initiated through a collision of the battery with selected surfaces of various types of bodies found within a celestial space environment. Such forces frequently are sufficient to rupture, fracture and otherwise destroy wet cell batteries of the commonly available commercial variety. This is due, in part, to the fact that these batteries are provided with insufficiently supported plates having large surface areas for providing a required electrical output. Where attempts have been made to increase the ruggedness of batteries by increasing the dimensions of the various components, a loss in the attendant watt-hour per pound of structure is encountered. This characteristic is particularly undesirable where the battery is to be included in a payload for a space probe.

OBJECTS AND SUMMARY OF THE INVENTION

This invention overcomes the aforementioned difficulties through the use of a wet cell electric storage battery having a plurality of narrow, thin flexible plates of a first polarity supported within grooves formed in opposing walls of the battery's housing, while the plates of the opposite polarity are suspended therebetween. The dimensions for the plates are such as to maximize energy output per pound of structure, while concurrently maximizing overall ruggedness for thus accommodating an application of forces acting normal to the plates, as the battery or its carrying vehicle is caused to impact on a given surface.

An object of this invention is to provide an improved electric storage battery.

Another object is to provide a lightweight electric storage battery having the capability of withstanding excessive inertial forces.

Another object is to provide an electric storage battery including a multiplicity of battery plates and means for supporting the plates against undesired displacement in the presence of forces of impact.

Another object is to provide an electric storage battery having good recycling characteristics with a configuration particularly suited for use in a high g-load environment, adapted to provide an improved ratio of watt-hour per pound of structure.

These together with other objects and advantages will become more readily apparent by reference to the following description and claims in light of the accompanying drawings.

BRIEF DESCRIPTION OF THE DRAWINGS

FIG. 1 is a perspective view of an electric storage battery having parallel sidewalls and constituting one embodiment of the present invention.

FIG. 2 is a partially sectioned, top plan view of the storage battery of FIG. 1.

FIG. 3 is a partially sectioned side elevation of the storage battery of FIG. 1.

FIG. 4 is an end elevation, in section, taken along line 4—4 of FIG. 3.

FIG. 5 is a partially sectioned perspective view of a battery plate, of a positive polarity, as employed in the storage battery illustrated in FIG. 1.

FIG. 6 is a partially sectioned perspective view of a plate of a negative polarity, also employed by the battery of FIG. 1.

FIG. 7 is a pictorial view of a step employed in providing the positive plate of FIG. 5 with a covering of plate separator material.

FIGS. 10 and 11 are perspective views of plate-connecting shims employed in coupling the plates of FIGS. 5 and 6 within the plate pack shown in FIGS. 8 and 9.

FIG. 14 is a schematic view illustrating a clamping effect by which the positive plates of the storage battery of FIG. 1 are retained in an operative relationship in an impact environment.

DESCRIPTION OF THE PREFERRED EMBODIMENTS

First Form

Figure 8:
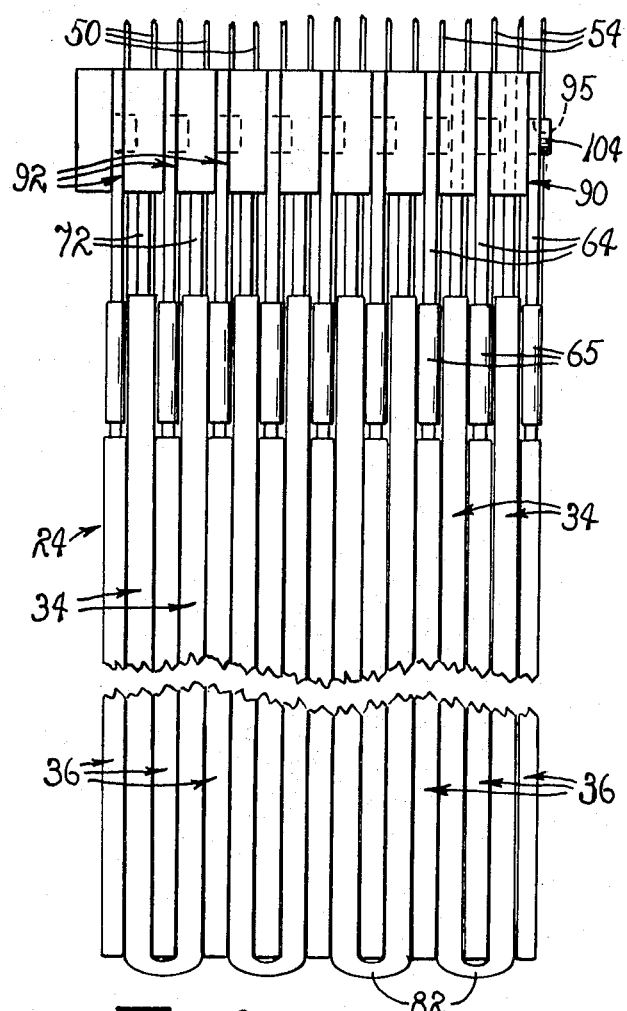
FIG. 8 is an enlarged side elevation of the battery plates of FIGS. 5 and 6 oriented in an operative disposition within a plate pack.

As illustrated in FIG. 1, one embodiment of the instant invention is an electric storage battery 10. The battery 10 is provided with a housing 11 including therein a pair of spaced, parallel sidewalls 12 and 14, a pair of spaced, parallel end walls 16 and 18, and a bottom 20 sealed to the pairs of walls and establishing a vertically disposed chamber 22 within which there is deposited a plate pack 24.

When assembled, the chamber 22 of the battery 10 is sealed through the use of a sealing cap 26 having provided thereon a pair of spaced terminals 28 and 30 of opposite electrical polarity. As a practical matter, the cap 26 also includes a chamber access port 31 which is sealed through the use of a removable screw-threaded plug 32.

In practice, the housing 11 is formed of any suitable material adapted to withstand structural loads of magnitudes which can normally be expected to be applied to the housing during its operation. The material employed also is electrically insulating in order to avoid short circuiting. As materials of suitable types, such as the various high-impact synthetic plastics, commercially are available, a detailed description is omitted. However, it is to be understood that the specific material employed is a lightweight, rugged material which is, for practical purposes, both chemically inert and electrically nonconductive.

As best illustrated in FIGS. 3 and 4, the plate pack 24 includes a plurality of positive plates 34 and a plurality of negative plates 36 disposed in alternate parallel planes within the chamber 22. Beneath the cap 26, and above the plate pack 24, there is disposed a chamber cover 38 rigidly seated on parallel shoulders 40 formed along opposite sidewalls 12 and 14 by machined reliefs, not designated. The cover 38 is of a cross-sectional configuration generally conforming to a W which provides a pair of elongated channels 42 and 44 extending in spaced parallelism along opposite sides of the cover for purposes of receiving therein lead-coupling bus bars 46 and 48 of a rodlike configuration.

Extending from the positive plates 34 there are electrical leads 50 which are wound about the bar 48. A cable 52 is extended to the terminal 30, from the bus bar, for thus establishing a positive polarity for that terminal. Likewise, from the negative plates 36 there are extended electrical leads 54 which are wound about the bus bar 46 which is provided with a cable 56 extending to the terminal 28 for thus establishing a negative polarity for the terminal.

The manner in which the cables 52 and 56 are connected with the terminals 28 and 30, respectively, is a matter of convenience. It will, however, be understood that each of the positive plates 34 is connected through an electrical lead 50 to the terminal 30, while each of the negative plates 36 is connected through a lead 54 to the terminal 28 for purposes of providing a current path for the electrical energy chemically developed within the battery 10. Once the bus bars 46 and 48 have been seated within the cover 38 and have received thereabout the appropriate electrical connecting leads 50 and 54, a potting compound 58, such as an epoxy resin, is employed in potting the wound bus bars 46 and 48 in fixed disposition within the cover 38.

The cap 26 is applied and sealed to the external surfaces of the walls of the housing 11, in any convenient manner, for thus effecting a final seal for the battery 10. With the battery 10 thus assembled and sealed, the plug 32 is removed and a suitable electrolyte is introduced through the port 31 into the chamber 22. The plug 32 then is reinserted into the port for purposes of completing the battery.

Plate Construction

The individual plates 34 and 36 of the plate pack 24 are best illustrated in FIGS. 5 and 6. As currently employed, the plates vary in the manner in which they are fabricated. A typical positive plate 34 is illustrated in FIG. 5 while a typical negative plate 36 employed by the storage battery of FIG. 1 is best illustrated in FIG. 6.

The plate 36 includes a relatively thin backbone 60 of a substantially rectangular configuration. The backbone is provided with a plurality of openings 62 extended therethrough and defining therewithin a gridlike structure. The backbone, if desired, is fabricated from a relatively thin sheet of zirconium, Inconel, or the like, etched or otherwise machined, to provide the desired openings 62. The backbone further includes an extended tonguelike tabular support 64 which acts as a suspension support for securing the plate within the plate pack 24 and the chamber 22. Additionally, each support 64 serves as a bonding contact for an electrical lead 54 which extends from the plate through the cover 38 to the terminal 28. The lead 54, in practice, is secured to the support 64 through the use of a deformable ferrule 65 arranged in a circumscribing relationship with the support 64 and the lead 50. However, it should readily be apparent that the manner in which the lead 54 is bonded to the support 64 may be varied as desired.

Within each of the openings 62 of the backbone 60 there is deposited a chemically active material 66 which serves to impart the negative polarity characteristics to the plate when the plate is situated in an activated battery. A typical material employed is a mixture of zinc oxide powder and sintered Teflon powder mixed into a rather mushy configuration. Of course, the particular material deposited within the openings is dictated by the type of battery thus fabricated. For example, where appropriate, cadmium oxide may be employed in filling the openings within the backbone 60.

As a practical matter, the plate 36 is completed by wrapping a suitable porous container 68 about the grid for supporting the chemically active material 66 within the openings 62. The material utilized for this purpose may be any one of several known battery separator material, such as, for example, radiation-modified polyethylene. Furthermore, where appropriate, the plate 36 can be fabricated from a solid sheet of exposed sheet metal, such as a sheet of zinc. However, such materials normally lack the chemically active capacity, per pound of material utilized in achieving resistance to deformation under shock loading.

The positive plate 34, as employed with the negative plate 36, is best illustrated in FIG. 5. The plate 34 includes a plate core or backbone 70 of a generally rectangular configuration. The plate core is fabricated from a flat sheet of zirconium, or any other suitable material, such as, for example, Inconel, silver and various silver alloys. The backbone 70 also includes an extended tabular support 72 of a tonguelike configuration, quite similar to the supports 64 employed by the plates 36. The electrical lead 50 is secured to the tabular support 72 through a ferrule 73 in a manner quite similar to that in which the ferrule 65 is employed in securing the lead 54 to the tabular support 64 of the plate 36.

About the backbone 70 there is provided an expanded metal grid 74 including therein grid openings 76. The grid is spotwelded or otherwise suitably secured to the backbone 70 in a manner such that the backbone 70 is caused to be substantially encased by the grid. The openings 76 serve as receptacles for a coating of porous sintered silver 78 which serves to impose an operative positive polarity on the plate. Hence, the resulting wet cell battery is a silver-zinc battery.

In order to maintain a desired separation between adjacent plates 34 and 36, within the plate pack 24, wither of the plates may be wrapped with a suitable separator material. However, and as a practical matter, the positive plates 34, in pairs, are wrapped in a sheet of separator material 80, in a manner best illustrated in FIG. 7. To accomplish a wrapping of the plates 34, they are laid in a spaced, end-to-end relationship upon a rectangular sheet of separator material 80 in a manner such that the tabular supports 72 are extended in opposite directions outwardly from opposite edges of the sheet. With the plates 34 thus oriented upon the sheet 80, the plates are wrapped with a rolling motion in a manner such that a multiply protective separator layer 82, FIG. 3, is provided in a surrounding relationship with the plates.

With the plates 34 thus wrapped, the plates are brought into a back-to-back, parallel relationship defining therebetween a plate-receiving space for receiving a negative plate 36. When the plates 34 and 36 are assembled in an operative disposition within the plate pack 24, the tabular supports 64, as provided for the positive plates 34, are aligned along one side of the plate pack 24, while the tabular supports 72, as provided for the negative plates 36, are aligned along the opposite side of the plate pack 24.

While it is quite practical to wrap the positive plates 34 in the sheet 80 for arranging the multiply separator 82 about these plates, it should be readily apparent that either or both sets of plates could be so wrapped.

Plate Mounting

As a practical matter, the negative plates 36 have a width dimension substantially greater than that of the positive plates 34 but have a length approximately that of the positive plates. However, the active width dimension for each plate of a positive-negative pair of determined by the width of the narrow plate. Consequently, when the plates are aligned within the plate pack 24, the positive plate 34 determines the active area of the plates. Consequently, the opposite peripheral portions of each of the negative plates 36 are extended and provide parallel edge portions extending beyond the active areas of the plates.

In practice, the edge portions of the negative plates 36 are employed in coupling plates of the plate pack 24 with the internal surfaces of the parallel walls 12 and 14 of the battery housing 11. The walls 12 and 14 are provided with a plurality of vertically extended, parallel grooves 84 which define therebetween coplanar protrusions defining lands 86. These lands extend between the edge portions of successive negative plates 36, as the edge portions thereof are inserted within the grooves 84. Hence, the lands 86 serve to support the individual negative plates 36 against lateral displacement as a force of impact $F_I$, FIG. 14, is applied normal to a plane of the plates.

Due to the fact that each negative plate 36 is, in effect, sandwiched between two positive plates 34, the positive plates 34 are supported against lateral displacement through an engagement with the negative plates 36. Therefore, it is to be understood that the peripheral portions of the negative plates 36 serve to support the plates of the plate pack 24 against lateral displacement as force is applied in directions normal to their planes.

As an assembled and supported plate pack 24 is subjected to forces of impact $F_I$ acting normal to the plane of the plates, there is a tendency for the individual plates to be deflected out of their parallel planes in directions common to the direction of the applied force. Therefore, at impact, it can be expected that the negative plates 36 will experience sufficient deflection to cause their edge portions to have a tendency to withdraw from the grooves 84 for thereby destroying the integrity of the battery 10. To overcome this effect, the grooves 84 are so dimensioned is to accommodate only limited pivotal displacement of the edge portions of the plates 36 as those portions are extended into the grooves 84 to position their surfaces in spaced parallelism with those of the side surfaces of the grooves 84.

Quite importantly, as the force $F_I$ is applied normal to the plane of the plates 36, the plates are flexed for displacing their center portions, or active areas. This deflection serves to cause the opposite edge portions of each of the negative plates 36 to be pivoted into engagement with the surfaces of the sidewalls of the grooves 84. Thus a clamping effect is achieved and a withdrawal of the edge portions of the plates from the supporting effect of the grooves is inhibited, due to the reaction force components $F_R$ and the attending forces of friction. Additionally, as can be appreciated, the force components $F_R$ tend to act in opposition to the force components $F_I$ and thus tend to impart rigidity to the individual plates.

The extent of the thus imposed deflection is determined by such factors as plate weight, length of span of the plates the modulus of elasticity of the material and the moment of inertia. Deflection may be determined through calculations made according to a formula $d=5Wl^4/384EI$ where $W$ equals plate weight, $E$ equals modulus of elasticity, $I$ equals moment of inertia, $l$ equals length of span and $d$ is the deflection.

In designing the plates 34 and 36 of the battery 10, the ratio of watt-hour per pound of material employed is of prime importance, as the battery 10 must be of a relatively lightweight construction for the purpose of accommodating delivery. Likewise, the structural strength of the plates also must be of prime importance in order to avoid structural failure in an impact environment. Since the width of the plates, formed of a material of a given specific weight, is a factor in determining watt-hour per pound output, as well as plate deflection, it is readily apparent that the plate span for a plate of a given material must be optimized. Consequently, a compromise between plate thickness and plate span is required. As a practical matter, it has been found that a backbone thickness greater than 0.02 inch results in an unacceptable watts per pound energy output ratio. Also, it has been found that the larger span for a backbone of 0.02 inch preferably is no larger than approximately 1.5 inches. A further trade-off towards a thinner backbone indicates that for a 0.01-inch backbone thickness the corresponding span must be less than 0.75 inch. A span of 1 inch for a backbone thickness of 0.017-inch zirconium, or 0.015-inch Inconel has been employed satisfactorily with a slot width of 0.04 inch and a depth of 0.162 inch for the grooves 84. A similar relationship for other materials under selected load conditions empirically may be determined.

As employed, the span between the internal surfaces of the walls 12 and 14, of the chamber 22, is 1 inch while the width of the plate 36 is 1.324 inches. With these dimensions, it is entirely practical to achieve a clamping of the edge portions of the plates in an impact environment. In practice, the width of the positive plate 34 is approximately 0.875 inch for thus allowing 0.063 inch on either side thereof for accommodating the presence of a wrapping material 68 applied thereto.

Of course, in order to achieve a desired energy output per pound ratio, it is necessary that the plates 34 and 36 provide a sufficient active plate area for achieving the desired watt-hours output. In employing plates of a narrow width, it has been found that the optimum plate height approximates the cell length, when 19 positive plates and 20 negative plates of the aforementioned dimensions are utilized in providing 20 watt-hours per pound energy output. Consequently, since the plate pack 24 is approximately 4 inches in length, the plate height also is approximately 4 inches. Of course, by varying the material from which the plates are formed, the desired watt-hour per pound energy output, the thickness of the plates and the span will be varied.

It is to be understood that the plates 34 and 36 are extremely thin, narrow and long and that alternate plates are secured along the internal surfaces of the chamber 22 of the battery housing 11 through the use of parallel grooves 84 which serve to achieve a clamping effect on the edge portion of the plates 36 as the plates are deflected in the presence of an applied load.

While the edge portions of the plates 36 preferably are employed in mounting the plate pack 24, the span relationship for plates 34 and 36 may be inverted so that the plates 34 are provided with edge portions extending into the groove 84 while the plates 36 are extended between the internal surfaces of the walls 12 and 14. This will be determined in part by the material and techniques employed in fabricating the plates.

Connecting Shims

Figure 12:
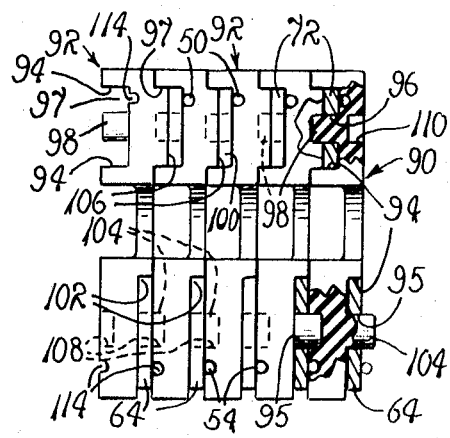
FIG. 12 is a partial top plan view of the plate pack shown in FIG. 8, illustrating the manner in which the shims of FIGS. 10 and 11 are employed in coupling plates of opposing polarity within the plate pack.
Figure 9:
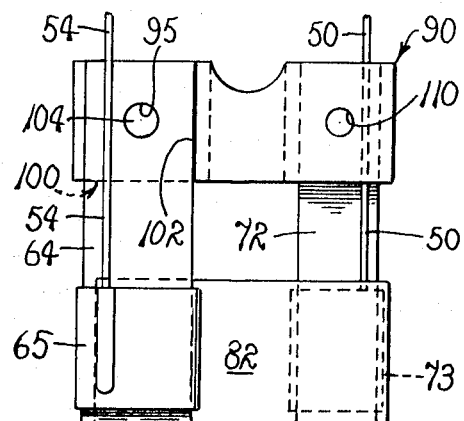
FIG. 9 is an end view of the plate pack illustrated in FIG. 8.
Figure 13:
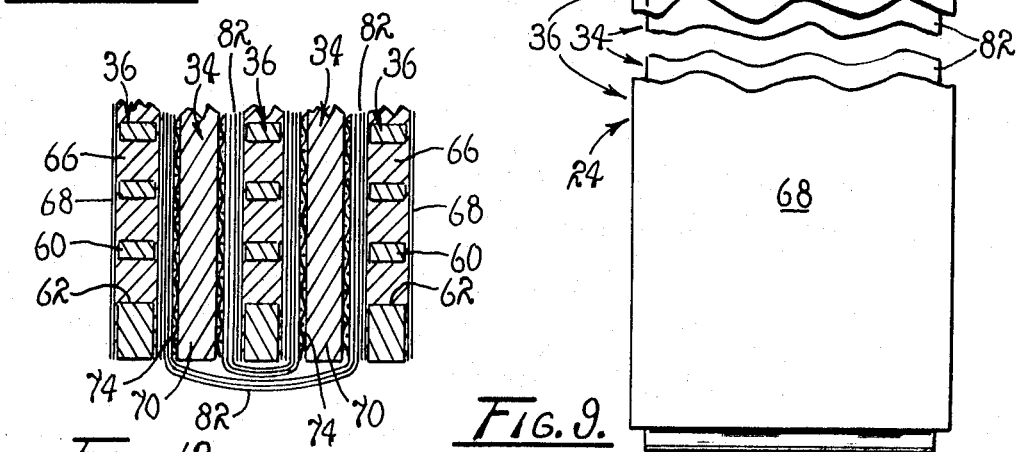
FIG. 13 is a fragmentary, sectioned, side elevation of the plate pack illustrated in FIG. 8.

In assembling the plate pack 24, preparatory to an insertion thereof into the chamber 22, the plates 34 and 36 are interconnected through a plurality of shims 90 and 92, as best illustrated in FIGS. 8 and 12. The shims 90 and 92 are formed of a suitable rigid insulating material, similar to that employed in fabricating the housing 11. These shims are adapted to couple the tabular supports 64 and 72 of the plates 34 and 36, respectively, into the unitary plate pack 24. It is intended that each of the shims 90 and 92 extends transversely of the plate pack 24 and be supportingly interconnected with a positive and a negative plate through its tabular support. However, since as a practical matter there are 20 negative plates 36 and only 19 positive plates 34, in a plate pack 24, an end shim 90, of the configuration illustrated in FIG. 10, is employed as well as an appropriate number of shims 92. In order to impart rigidity and accommodate assembly, each positive plate 34 is suspended from a channular end portion defined by a pair of shoulders 94, while the opposite end portion is provided with a single shoulder 94.

As best illustrated in FIGS. 8 and 12, each of the tabular supports 64 and 72 is provided with a circular perforation 95 and 96, respectively. These openings are employed in coupling the respective plates within an appropriate shim. As shown in FIGS. 10 through 12, each of the shims 90 and 92 is provided with a transverse channel 97, between shoulder 94, having near its center an extended cylindrical protrusion or pin 98. The channel 97 forms an end segment 100 and is of a width sufficient to receive therein the tabular support 72, while the pin 98 serves as a mounting means projected through the opening 96 of the tabular support. Through this coupling, each plate 34 is joined with a shim 90 into a substantially rigid entity.

Each of the shims 90 and 92 also is provided with an open end, right-angle segment 102. This segment is defined by the single shoulder 94 and has a width sufficient to receive therein the tabular support 64 of the negative plate 36. A cylindrical protrusion 104 extends from the surface of the right-angle segment in a manner such as to receive the opening 95 formed within the tabular support 64 for thus interconnecting the negative plates with the shims. Therefore, the tabular supports 64 and 72 of the endmost negative plate 36 and the positive plate 34 of the plate pack 24, are interconnected into a unitary structure.

While the shim 92 is of a configuration quite similar to that of the shim 90, the shim 92 further includes a raised locking tongue 106 received within the contiguous section of an adjacent shim in a manner which serves to impart rigidity to the coupled shims. It is important to note that the surfaces of the shims 90 and 92 adjacent the pins 104 include circular relief openings 108 coaxially disposed opposite the pins 104. The purpose of these openings is to receive the distal end portion of the succeeding pin 104 as it extends through the opening 95 within the tabular support 64.

In a similar manner, the shims 92 each includes a relief opening 110 adjacent the pins 98 which serves to receive therein the distal end of the succeeding pin 98 as the pin is extended through the opening 96 in the tabular support 72. Consequently, it should be appreciated that the distal end of each of the tabular supports 72 is secured between adjacent faces of the shims with a pin 98 being extended therethrough. Through the use of the shoulders of the tongue 106 a rigid structure is provided as the positive sections of the shims are brought into a contiguous relationship. As a practical matter, the shims 90 and 92 may be provided with a plurality of pins 114 for receiving therein the cables 52 and 56 when assembled into a unitary structure.

In assembling the plate pack 24, the plates 34 and 36 are interspersed in an alternating manner so that each plate 36 is supported between a pair of positive plates 34. During the assembly of the plates, the shims 90 and 92 are fitted within the uppermost end of the plate pack 24 in a manner such as to receive therebetween the tabular supports 64 and 72 which are thus secured into a unitary plate pack 24 as the plates 34 and 36 are suspended therefrom.

As a practical matter, the internal walls 12 and 14, of the chamber 22, are provided with a pair of oppositely arranged shoulders 112 upon which the extremities of the shims 90 and 92 are seated in order that the shims may be secured between the lower surface of the cover 38 for supporting the plates 34 and 36 in suspension above the internal surface of the bottom plate 20.

The thus assembled plate pack 24 is deposited within the chamber 22 of the housing 11 of the electric storage battery 10 in a manner such that the edge portions of each of the plates 36 are received within one of the grooves 84, between a pair of lands 86. Once the plate pack 24 is seated with the shims resting on the shoulders 112, the electrical leads 50 and 54 are drawn through the cover 38 and coupled with the terminals 28 and 30 and assembly of the battery 10 is completed in the manner described, so that a sealed shock-resistant battery 10 is provided for use in an impact environment.

With the battery thus assembled, it is activated by delivering thereto a suitable electrolyte, such as an electrolyte formed as a fluid mixture containing between 35 and 45 percent, by weight, of potassium hydroxide in a water, which is further saturated with a zinc oxide powder. Of course, the particular electrolyte employed is selected in accordance with the specific type of battery being assembled.

Second Form

Figure 17:
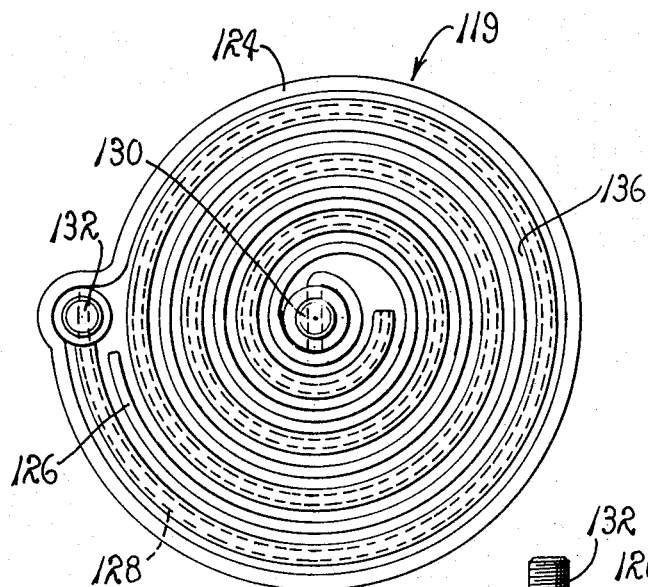
FIG. 17 is a top plan view illustrating the plate pack employed by the storage battery illustrated in FIG. 16.
Figure 16:
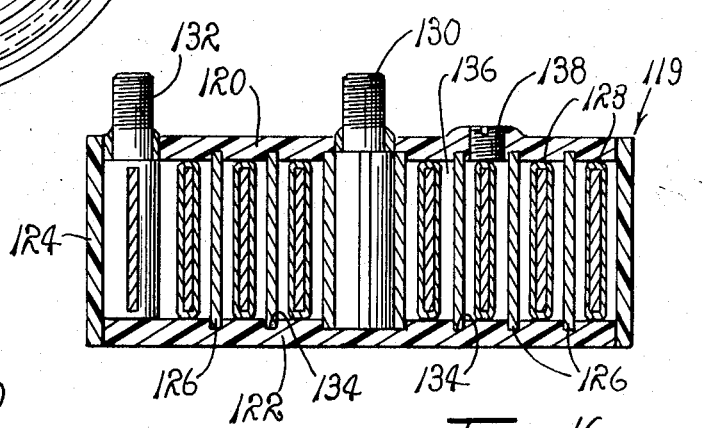
FIG. 16 is a cross-sectional view taken generally along line 16—16 of FIG. 15.
Figure 15:
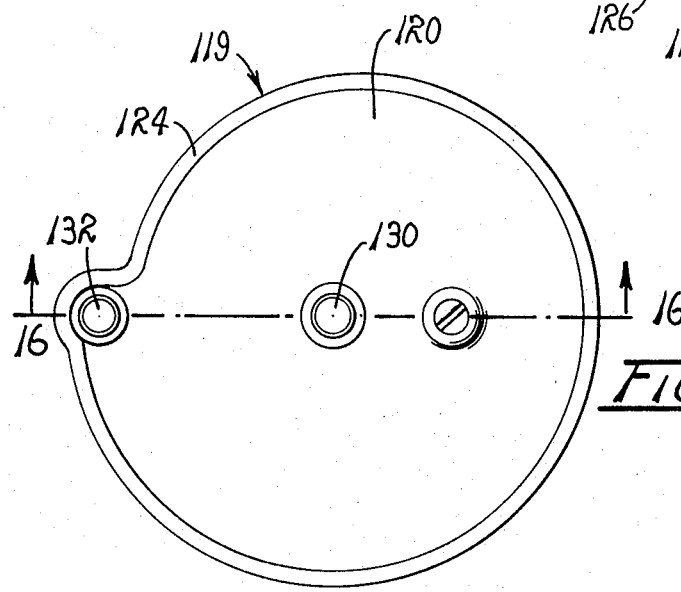
FIG. 15 is a top plan view of an electric storage battery having a pair of continuous plates and constituting another embodiment of the instant invention.

Turning to FIGS. 15-17, therein is illustrated a battery 119, which is a second embodiment of the invention. However, in this embodiment the battery housing is of a generally circular configuration and includes a pair of parallel sideplates 120 and 122 and a circumscribing wall 124 which serves to define the housing for the battery.

The storage battery 119 includes therein a negative electrode or plate 126 of a spiral configuration and a positive electrode or plate 128 of a similarly spiraled configuration. In practice, the plates 126 and 128 are formed of a material quite similar to that employed in the fabrication of the plates 34 and 36. However, in this instance, the plates are formed as elongated strips and subsequently are interspersed and wound into the selected configuration. The negative plate 126 terminates in a negative terminal 130, while the positive plate 128 terminates in a positive terminal 132.

The manner in which the battery 119 is fabricated is quite similar to the manner in which the battery 10 in FIG. 1 is fabricated in that the negative plate 126 is disposed between adjacent surfaces of a wrapped positive plate 128 and is seated in opposed grooves 134, also formed in a spiral configuration and extended along opposed surfaces of the walls 120 and 122 which define a chamber 136. As a practical matter, a suitable electrolyte is delivered to the battery 119 through a displaceable plug 138 extending through one of the walls of the housing.

With the embodiments of the instant invention assembled in the manner heretofore described, there is provided an improved storage battery having good recycling capability, a high watt-hour per pound ratio and a rugged configuration adapted to withstand impact loads imposed by forces of impact acting on the battery normal to the plane of the plates.

Although the invention has been herein shown and described in what are conceived to be the most practical and preferred embodiments, it is recognized that departures may be made therefrom within the scope of the invention.

What is claimed is:

1. An electric storage battery comprising:
   A. a battery housing defined by a plurality of rectangularly configured walls having opposed surfaces disposed in spaced parallel planes and defining a sealed enclosure having sidewalls of a greater depth than length and end walls having a greater depth than width;
   B. means defining a plurality of grooves of a common dimension extending vertically along the surfaces of the sidewalls and defining a plurality of opposed lands therebetween;
   C. a plurality of battery plates of a first polarity disposed in a spaced, parallel relationship within the enclosure and having a greater length than width and including a pair of parallel side edge portions disposed within said grooves;
   D. a plurality of battery plates of a second polarity having a greater length than width alternately interspersed between the plates of the first polarity, in a parallel relationship therewith, and including a pair of spaced parallel edge portions disposed adjacent opposed surfaces of said lands;
   E. a tabular support extended from each of said plates in a manner such that the tabular supports of the plates of said first polarity are disposed adjacent the surface of one sidewall of said housing, while the tabular supports of the plates of the second polarity are disposed adjacent the surface of the opposite sidewall of said housing; and
   F. support shims interconnecting said tabular supports fixed to the walls of said housing in a manner such that said plates are suspended from the support shims.

2. The battery of claim 1 wherein the battery plates are provided with battery plate-separating material adapted to maintain said plates in a spaced relationship.

3. The battery of claim 2 wherein the plates of the first polarity are of a substantially flexible material and the relative dimension of the grooves and the edge portions of the plates disposed therein are such as to achieve a clamping of the plates as the plates are flexed under predetermined loads.

4. The battery of claim 1 wherein each of said plates includes a flexible backbone bearing a chemically active material, and plate-separating means supporting said plates in a spaced relationship.

5. In an electric storage battery of the type including multiple walls defining a substantially sealed enclosure and a plurality of battery plates of opposite polarity alternately arranged within the enclosure and disposed in substantially parallel planes, the improvement comprising:

means for supporting a pair of adjacent plates in suspension comprising a tabular support vertically extended from each of said plates, and an elongated shim supported by said walls having means securing to one end portion thereof a tabular support extended from one plate of said pair, and means for securing to the other end portion thereof a tabular support extended from the other plate of said pair, whereby adjacent plates of opposite polarity are suspended from opposite end portions of said elongated shim.

* * * * *